(No Model.)
R. J. BALCH.
FILTER.
No. 532,939. Patented Jan. 22, 1895.
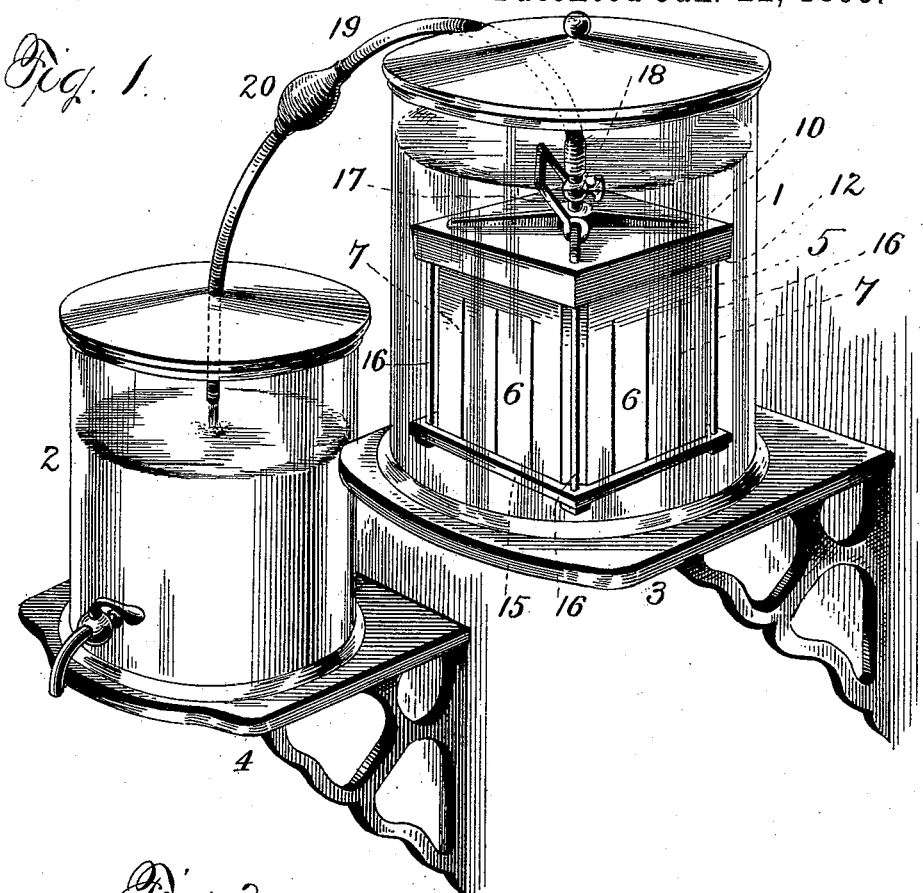
Fig. 1.
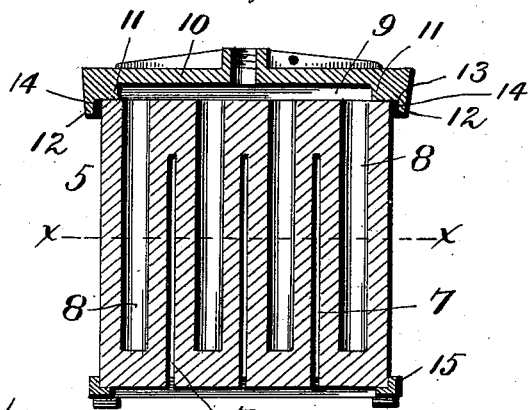
Fig. 2.
Fig. 3.
Witnesses
C. J. Williamson
Alfred T. Gage
Inventor
Richard J. Balch
by W. F. Henderson
Attorney

UNITED STATES PATENT OFFICE.

RICHARD J. BALCH, OF SENECA, MISSOURI.

FILTER.

SPECIFICATION forming part of Letters Patent No. 532,939, dated January 22, 1895.

Application filed September 17, 1894. Serial No. 523,182. (No model.)

*To all whom it may concern:*

Be it known that I, RICHARD J. BALCH, a citizen of the United States, residing at Seneca, in the county of Newton and State of Missouri, have invented certain new and useful Improvements in Filters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to filters, more particularly to water filters; and it has for its object to provide a filter having a greatly increased capacity to quickly and efficiently filtrate the water, and also to provide means for both starting the flow of the filtered water from the filtering vessel into the dispensing vessel and for creating a back pressure in the filter for the purpose of thoroughly cleansing the filter without the necessity of removing it from the filtering vessel.

To the accomplishment of the foregoing and such other objects as may hereinafter appear the invention consists primarily in a filtering block of tripoli, or equivalent porous stone, but preferably tripoli, divided into tubes or sections of any desired number and dimensions and shape by slots or divisions sawed or otherwise formed so as to extend partially but not entirely through the block or body, thereby causing the different tubes or sections to be held together by a portion of the material itself constituting the filtering substance, each tube or section constituting an independent filtering medium which is formed with a central longitudinal bore or conduit open at one end and into which the water is filtered laterally from the many sides of the tube or section and from which it passes out of the open end into a chamber whence it is delivered to the dispensing vessel.

The invention further consists in a siphon connected with the filterer and provided with a compressible bulb so that by manipulation of said bulb the siphon will be started, and by temporarily closing the siphon below the bulb and then manipulating the bulb a back pressure will be created through the filter block and the latter cleansed of sediment that has deposited on its outside walls.

The invention further consists in other features of construction and combination hereinafter more particularly described; the several features of the invention being sought to be specifically defined by the claims following this specification, reference being had to the accompanying drawings, forming a part hereof, in which—

Figure 1 is a perspective of a filter embodying my invention. Fig. 2 is a vertical section through the filter block and its frame; and Fig. 3 is a cross section through the block on the line x—x of Fig. 2.

In the drawings the numeral 1 designates a filtering vessel and 2 the dispensing vessel which receives the filtered water from the filter, which two vessels may be of any suitable dimensions and desired configuration. The two vessels are illustrated as resting upon brackets 3 and 4, with the vessel 2 on a lower level than vessel 1 but which may be otherwise than as illustrated.

In the filtering vessel 1 is placed the filter proper which is formed of a block or body 5 of tripoli of any suitable shape. This block is divided into a number of tubes or sections 6 by slots or kerfs 7 which extend through the body or block to within one half inch, more or less, of one side thus dividing the block into the desired number of tubes or sections all connected together at one end by the portion of the block or body through which the slots or kerfs do not extend. Through the solid portion of the block and extending into the tubes or sections formed as described to within one half inch, more or less, of the lower end of each tube or section, are a number of bores or cavities 8, one for each tube or section. The filtering block thus formed presents a very extended surface to the water to be filtered as each tube or section presents at least four walls through which the water percolates laterally and enters the cavities 8 in a filtered and purified state and from the upper open end of each of which cavities it discharges into a chamber 9 at the top of the block from whence it flows to the dispensing vessel 2. The chamber 9 is preferably formed by a metallic cap 10 formed on its under surface with a flange 11 to rest upon the top of the filtering block so as to support the cap above the block in a manner to form the chamber 9. The outer edge of the cap is formed with a flange 12 which extends down around the top edge of the block beyond the sides thereof to form a space 13 to receive a packing or cement 14 to make a close water tight joint between the cap and the block around the upper edge of the latter. The filtering block 5 is set upon an open frame 15, and upright bolts 16, placed preferably at the corners of the block, connect the frame 15 with the projecting or peripheral portion of the cap 10, and thus is formed an open frame containing and protecting the porous block of tripoli at the points where it is most liable to be injured.

The cap 10 is provided with a hinged handle 17 by which the filter block can be lifted and carried, and is also formed with a nipple 18 through which the filtered water may flow from the chamber 9 into a siphon which draws the water from chamber 9 and feeds it to the dispensing vessel 2. This siphon is designated by the numeral 19 and is preferably formed of a rubber tube provided intermediate of its ends, say, at a point about one and a half feet from the nipple 18, with a compressible bulb 20 so that when it is desired to start the siphon into action it is only necessary to manipulate the bulb to make the necessary suction. This bulb also serves to create a back pressure through the filtering block by simply temporarily stopping or closing the siphon tube below the bulb, say by compressing it, and then manipulating the bulb so as to force the filtered water backward through the filtering block thus clearing the pores of the block and washing the sediment from the sides of the tubes or sections of the block.

The filter formed as described is not only simple, durable and easily handled and manipulated, but owing to the material of which it is formed and its construction which presents a very large filtering service, is also very efficient in thoroughly filtering the water and in performing its duty with rapidity. A block eight by eight inches square and formed as described and illustrated has the capacity to filter one gallon of water in two minutes of time, more of less.

The blocks are made in various sizes and with varying number of tubes or sections according to the particular service for which they may be intended.

It is preferred to make the blocks square or rectangular in form as illustrated but they may be made in other forms without departing from the essentials of the invention. I have also shown and described the preferred details of construction of the several parts but they may be changed without departing from the essential features of the invention.

Having described my invention and set forth its merits, what I claim is—

1. The filtering block composed of tripoli divided into a series of tubes or sections by slots or kerfs extending partially through the block, and having bores or cavities formed in said tubes or sections and opening through the solid portion of the block, substantially as and for the purposes described.

2. The filtering block composed of a porous body divided into a series of tubes or sections by slots or kerfs extending partially through the block, and having bores or cavities formed in said tubes or sections and opening through the solid portion of the block, in combination with a cap applied to the solid portion of the block and raised above the same to form a water chamber in communication with the cavities of the tubes or sections, and an outlet nipple to the cap, substantially as and for the purposes described.

3. The filtering body composed of a porous substance comprising a series of tubes or sections separated from each other and formed with bores or cavities open at one end, a filtered water chamber into which said bores or cavities open, and an open frame containing and protecting said porous filtering body, substantially as and for the purposes described.

4. The filtering block of porous substance divided into a series of tubes or sections by slots or kerfs extending partially through the block, the tubes or sections having bores or cavities formed therein, in combination with a cap formed with a flange resting against the solid portion of the block to raise the cap to form a water chamber and provided with a second flange fitting down over the edges of the block, the second flange extending beyond the sides of the block to leave a space to receive a packing or cement to form a close water tight joint with the filtering block, substantially as and for the purposes described.

5. The filtering body composed of a porous substance formed into a series of tubes or sections having bores or cavities open at one end, a water chamber into which said bores or cavities open, and a siphon in communication with said water chamber and having a compressible bulb intermediate of its ends, substantially as and for the purposes described.

In testimony whereof I affix my signature in presence of two witnesses.

RICHARD J. BALCH.

Witnesses:
J. T. BARRETT,
R. H. TESPERMAN.